W. DIETZ.
FAUCET.
APPLICATION FILED JAN. 28, 1921.

1,419,237.

Patented June 13, 1922.

Witnesses,
Sheldon Clock
J. D. Stuwe

Inventor,
William Dietz,
By Joshua R H Booth
His Attorney.

UNITED STATES PATENT OFFICE.

WILLIAM DIETZ, OF FOREST PARK, ILLINOIS.

FAUCET.

1,419,237.   Specification of Letters Patent.   Patented June 13, 1922.

Application filed January 28, 1921. Serial No. 440,607.

*To all whom it may concern:*

Be it known that I, WILLIAM DIETZ, a citizen of the United States, and a resident of Forest Park, county of Cook, and State of Illinois, have invented certain new and useful Improvements in Faucets, of which the following is a specification.

My invention relates to improvements in faucets, more particularly to drip faucets, and it has for its object the provision of a faucet which may be mounted on a tank, can, or similar container by inserting it from the exterior through the wall of said tank, can or container, and attaching it thereto in a fluid-tight manner without the use of solder.

Other objects will appear hereinafter.

The invention consists in the combinations and arrangements of parts hereinafter described and claimed.

Figure 1:
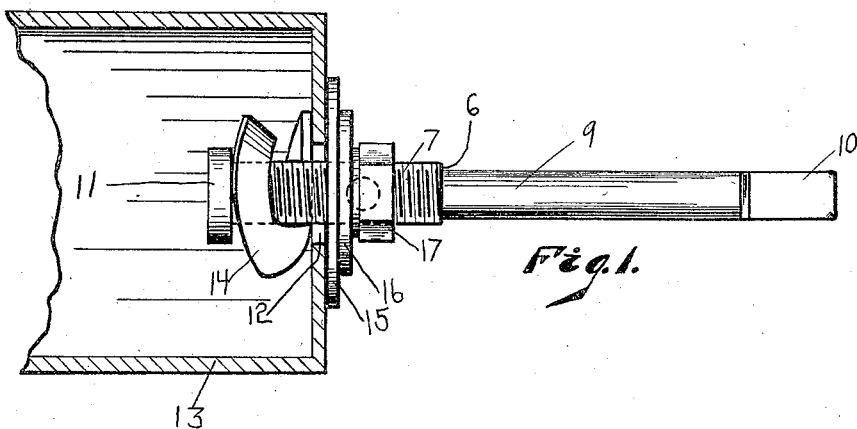
Figure 2:
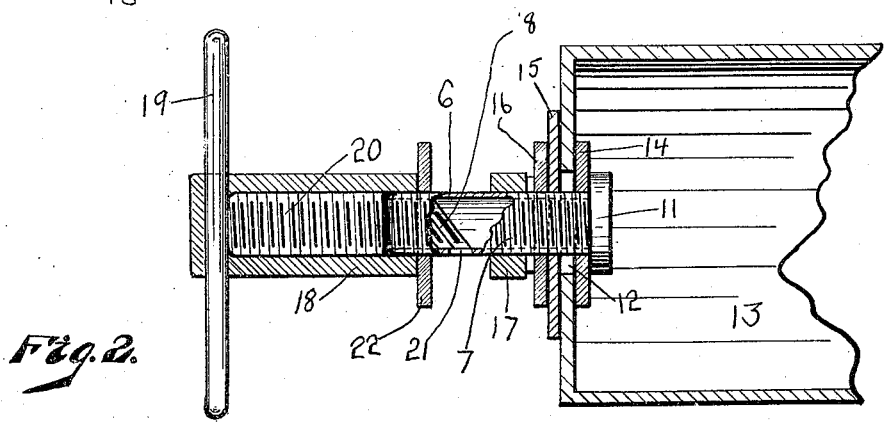
Figure 3:
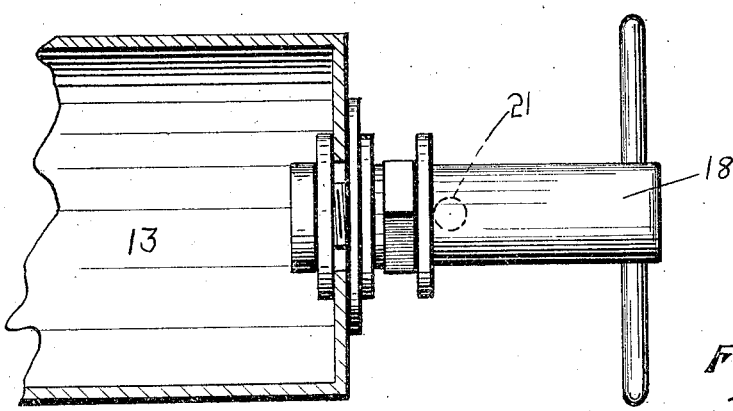

The invention will be best understood by reference to the accompanying drawings forming a part of this specification, and in which, Fig. 1 is a plan view showing the faucet assembled in position on a container with the holder stem attached thereto and before the members have been tightened against the wall of said container;

Fig. 2 is a side view thereof, with the faucet firmly seated on the wall of the container, parts being broken away and the cap being withdrawn beyond the opening; and Fig. 3 is a plan view showing the members of the faucet firmly seated on the wall of the container and the cap member in closed position.

The construction illustrated comprises a tubular member 6 provided with exterior threads 7 and interior threads 8 which extend in a direction reverse to the exterior threads. Said reverse interior threads are adapted to engage similar threads provided on one end of a holding stem 9 which has a rectangular portion 10 on its other end.

The tubular member is provided with a circular flange 11 on one end adapted to be inserted through a suitable opening 12 provided in the container 13 upon which the faucet is to be mounted. This opening is of just sufficient size to admit the flange 11, and a split spring washer 14 is inserted through this opening by a rotational turning movement and seated against said flange. A gasket 15 of any suitable material is placed upon the tubular member on the exterior of the container, and a washer 16 is placed above said gasket. A threaded member or nut 17 engages the exterior threads 7 on the tubular member, and by rotating the same sufficiently and at the same time holding the stem 9 at its end 10 against rotation, the threaded member 17 forces the washer 16 and gasket 15 against the exterior of the wall, and at the same time forces the split washer 14 and flange 11 firmly against the interior of said wall, as shown in Figs. 2 and 3, thereby forming a fluid-tight closure around said tubular member. After the faucet is in position as above described, the holding stem 9 is removed therefrom.

A closure cap 18 provided with a finger bar 19 is mountable on the free end of the tubular member, and is provided with interior threads 20 which engage the threads 7 of said member. This closure cap may be rotated to close an opening 21 provided in the tubular member, as shown in Fig. 3, or it may be released to expose any desired portion of said opening and thereby emit the fluid at any desired rate. A gasket 22 is also provided to form a firm closure between the cap 18 and the threaded member 17.

It is thus evident that I have provided a faucet which may be mounted upon a container by inserting it from the exterior through the wall of said container, and without the use of solder or any similar fastening means.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A faucet mountable on a container, comprising a tubular member carrying a flange at one end and a spring washer movably mounted adjacent thereto, said flange and washer being insertable through a wall of said container, said washer by a rotational movement; and means on said tubular member exterior of said wall co-operating with said movable washer and flange to retain said faucet in fluid-tight position on said wall.

2. A faucet comprising a tubular member carrying a flange at one end and a split spring washer adjacent thereto, said flange and washer being insertable through a wall of said container; means on said tubular member exterior of said wall co-operating with said tubular member and flange to retain said faucet in fluid-tight position in said wall; and a cap for closing said tubular member or for emitting fluid therefrom at any rate of flow.

3. A faucet mountable on a container, comprising a tubular member; means mounted on one end of said tubular member insertable inward through a wall of said container and adapted to bear resiliently against the inside of said wall; means mounted on said tubular member exterior of said wall; a nut threaded on the exterior of said tubular member; and threads on the interior of said tubular member, reversed to the threads in said nut, for engaging a holding stem to enable said nut to force said inside and said exterior means in fluid-tight contact with said wall.

4. A faucet mountable on a container comprising a tubular member; means mounted on one end of said tubular member insertable inward through a wall of said container and adapted to bear against the inside of said wall; means mounted on said tubular member exterior of said wall; a threaded member mounted on said tubular member; and threads on the interior of said tubular member, adapted to engage a holding stem and permit rotation of said threaded member to force said inside and said exterior means in fluid-tight contact with the wall.

5. A faucet mountable on a container, comprising a tubular member carrying a flange at one end and a split spring washer movably mounted adjacent thereto, said flange and washer being insertable through a wall of said container and adapted to bear resiliently against the inside of said wall; means mounted on said tubular member exterior of said wall; a threaded member mounted on said tubular member; and threads on the interior of said tubular member, adapted to engage a holding stem and permit rotation of said threaded member to force said inside and said exterior means in fluid-tight contact with said wall.

In testimony whereof I have signed my name to this specification in the presence of two subscribing witnesses.

WILLIAM DEITZ.

Witnesses:
  Joshua R. H. Potts,
  Freda C. Appleton.